United States Patent
Pelegri et al.

(10) Patent No.: US 7,898,260 B2
(45) Date of Patent: Mar. 1, 2011

(54) METHOD AND APPARATUS FOR DETECTING BOREHOLE EFFECTS DUE TO ECCENTRICITY OF INDUCTION INSTRUMENTS

(75) Inventors: Luis M. Pelegri, Humble, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 40 days.

(21) Appl. No.: 12/099,625

(22) Filed: Apr. 8, 2008

(65) Prior Publication Data

US 2008/0252295 A1    Oct. 16, 2008

Related U.S. Application Data

(60) Provisional application No. 60/910,948, filed on Apr. 10, 2007.

(51) Int. Cl.
    *G01O 3/10* (2006.01)
(52) U.S. Cl. .................................................. 324/343
(58) Field of Classification Search .......... 324/339–343
    See application file for complete search history.

(56) References Cited

U.S. PATENT DOCUMENTS

| | | | |
|---|---|---|---|
| 4,302,722 A | 11/1981 | Gianzero | |
| 4,780,678 A | 10/1988 | Kleinberg et al. | |
| 4,837,517 A | 6/1989 | Barber | |
| 4,980,643 A | 12/1990 | Gianzero et al. | |
| 5,157,605 A | 10/1992 | Chandler et al. | |
| 5,159,577 A * | 10/1992 | Twist | 367/25 |
| 5,600,246 A | 2/1997 | Forgang et al. | |
| 6,470,274 B1 | 10/2002 | Mollison et al. | |
| 6,541,979 B2 | 4/2003 | Omeragic | |
| 6,573,722 B2 * | 6/2003 | Rosthal et al. | 324/338 |
| 6,636,045 B2 | 10/2003 | Tabarovsky et al. | |
| 6,643,589 B2 | 11/2003 | Zhang et al. | |
| 6,927,578 B2 | 8/2005 | Homan et al. | |
| 6,927,741 B2 * | 8/2005 | Brune et al. | 343/867 |
| 6,998,844 B2 | 2/2006 | Omeragic et al. | |
| 7,031,839 B2 | 4/2006 | Tabarovsky et al. | |
| 7,091,877 B2 | 8/2006 | Barber et al. | |
| 7,443,359 B2 * | 10/2008 | Brune et al. | 343/866 |
| 7,483,793 B2 * | 1/2009 | Wang et al. | 702/7 |
| 7,663,372 B2 * | 2/2010 | Signorelli et al. | 324/343 |
| 2004/0073372 A1 * | 4/2004 | Blanch et al. | 702/14 |

(Continued)

OTHER PUBLICATIONS

J. H. Moran et al., Basic Theory of Induction Logging and Application to Study of Two-Coil Sondes, Geophysics, vol. XXVII, No. 6, Part 1 (Dec. 1962), pp. 829-858.

*Primary Examiner*—Jay M Patidar
(74) *Attorney, Agent, or Firm*—Mossman Kumar & Tyler PC

(57) ABSTRACT

An apparatus, method and computer-readable medium for evaluating an earth formation are disclosed. A logging tool which has two coplanar antennas disposed at a known distance from an axis of the logging tool is conveyed into a borehole. The presence of a borehole effect is determined from a difference between outputs of the two antennas. The borehole effect may include eccentering of the logging tool in the borehole. Measurements made by an additional antenna and/or the two coplanar antennas may be corrected for the effects of eccentering. Horizontal and vertical formation resistivity as well as additional petrophysical properties may be determined.

12 Claims, 4 Drawing Sheets

U.S. PATENT DOCUMENTS

2005/0083161 A1    4/2005  Minerbo et al.
2005/0116718 A1*   6/2005  Chen et al. .................. 324/338
2006/0155471 A1*   7/2006  Tabarovsky et al. ............ 702/6
2010/0179762 A1*   7/2010  Tabarovsky et al. ............ 702/7

* cited by examiner

_US 7,898,260 B2_

METHOD AND APPARATUS FOR DETECTING BOREHOLE EFFECTS DUE TO ECCENTRICITY OF INDUCTION INSTRUMENTS

CROSS-REFERENCES TO RELATED APPLICATIONS

This application claims priority from U.S. Provisional Patent Application Ser. No. 60/910,948 filed on Apr. 10, 2007.

BACKGROUND OF THE DISCLOSURE

1. Field of the Disclosure

The present disclosure relates generally to obtaining electrical measurements in a formation surrounding a borehole. In particular, the present disclosure relates to reducing the borehole effect from electrical measurements obtained at an instrument conveyed in a borehole.

2. Description of the Related Art

Electromagnetic induction resistivity well logging instruments are well known in the art for determining the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, _Basic Theory of Induction Logging and Application to Study of Two-Antenna Sondes_, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 to Barber, in U.S. Pat. No. 5,157,605 to Chandler et al., and in U.S. Pat. No. 5,600,246 to Fanini et al.

Conventional induction well logging techniques employ an insulating pipe inside a antenna mandrel. One or more transmitter antennas are energized by an alternating current. The oscillating magnetic field produced by this arrangement results in the induction of currents in the formations which are nearly proportional to the conductivity of the formations. These currents, in turn, contribute to the voltage induced in one or more receiver antennas. By selecting only the voltage component which is in phase with the transmitter current, a signal is obtained that is approximately proportional to the formation conductivity. In a conventional induction logging apparatus, the basic transmitter antenna and receiver antenna have axes which are aligned with the longitudinal axis of the well logging device. (For simplicity of explanation, it will be assumed that the borehole axis is aligned with the axis of the logging device, and that these are both in the vertical direction.) This arrangement tends to induce secondary current loops in the formations that are concentric with the vertically oriented transmitting and receiving antennas. The resultant conductivity measurements are indicative of the horizontal conductivity (or resistivity) of the surrounding formations. There are, however, various formations encountered in well logging which have a conductivity that is anisotropic. Conventional induction logging devices, which tend to be sensitive only to the horizontal conductivity of the formations, do not provide a measure of vertical conductivity or of anisotropy. Techniques have been developed to determine formation anisotropy, such as U.S. Pat. No. 4,302,722 to Gianzero et al., for example.

Multi-component signals can be used for interpreting formation resistivities and petrophysical parameters. The principles used for this interpretation have been discussed, for example, in U.S. Pat. No. 6,470,274 to Mollison et al., U.S. Pat. No. 6,643,589 to Zhang et al., and U.S. Pat. No. 6,636,045 to Tabarovsky et al., the contents of which are incorporated herein by reference. Specifically, the parameters estimated may include horizontal and vertical resistivities (or conductivities), relative dip angles, strike angles, and petrophysical quantities such as sand and shale content and water saturation. In addition, U.S. patent application Ser. No. 11/125,530 of Rabinovich et al. teaches the use of multi-component measurements for analysis of fractured earth formations that may also have anisotropic layers. These multi-component signals are typically obtained using a multi-component measurement tool having antennas oriented transverse to the tool axis in addition to antennas oriented parallel to the tool axis.

The use of transverse antennas leads to a creation of and susceptibility to current produced in the borehole, known as the borehole effect. The net borehole current induces signals in transverse receiver antennas, especially coplanar transmission and receiver antennas. There current-induced signals are generally stronger for higher mud conductivity.

Obtaining accurate transverse antenna measurements depends on reducing non-formation effects such as borehole effects. The borehole effect appears when the measurement tool is not centered within the borehole. There is a need for recognizing the effect of borehole currents due to eccentricity of the tool within the borehole. The present disclosure addresses this issue.

SUMMARY OF THE DISCLOSURE

One embodiment of the disclosure is an apparatus for evaluating an earth formation. The apparatus includes a logging tool which has two coplanar antennas with each disposed at a known distance from an axis of the logging tool. The logging tool is conveyed in a borehole in the earth formation. The difference of the outputs of the two additional antennas is indicative of a borehole effect such as an eccentering of the tool. A processor detects this borehole effect and may further process the signal from an additional antenna and/or the two coplanar antennas to correct for the borehole effect. The processor may further estimate from the corrected measurements a resistivity property of the earth formation and additional petrophysical properties that may be determined from the resistivity properties.

Another embodiment of the disclosure is a method of evaluating an earth formation. A logging tool which has two coplanar antennas disposed at a known distance from an axis of the logging tool is conveyed into a borehole. A difference between outputs of the two antennas is indicative of a borehole effect such as an eccentering of the logging tool in the borehole, and upon detection of this eccentering, measurements made by an additional antenna and/or the two coplanar antennas may be corrected for the effects of eccentering. The horizontal and vertical formation resistivity as well as additional petrophysical properties may be determined.

Another embodiment of the disclosure is a computer readable medium for use with an apparatus for evaluating an earth formation. The apparatus includes a logging tool which has two coplanar antennas are disposed at a known distance from an axis of the logging tool. The logging tool is conveyed in a borehole in the earth formation. The medium includes instructions which enable a processor to detect a borehole effect such as an eccentering and further process the signal from the two additional antennas to correct for the effects of eccentering. The instructions may further enable the processor to estimate from the corrected measurements a resistivity property of the earth formation and additional petrophysical properties that may be determined from the resistivity properties.

BRIEF DESCRIPTION OF THE DRAWINGS

The present disclosure is best understood with reference to the following figures in which like numbers refer to like components and in which.

DETAILED DESCRIPTION OF THE DISCLOSURE

Figure 1:
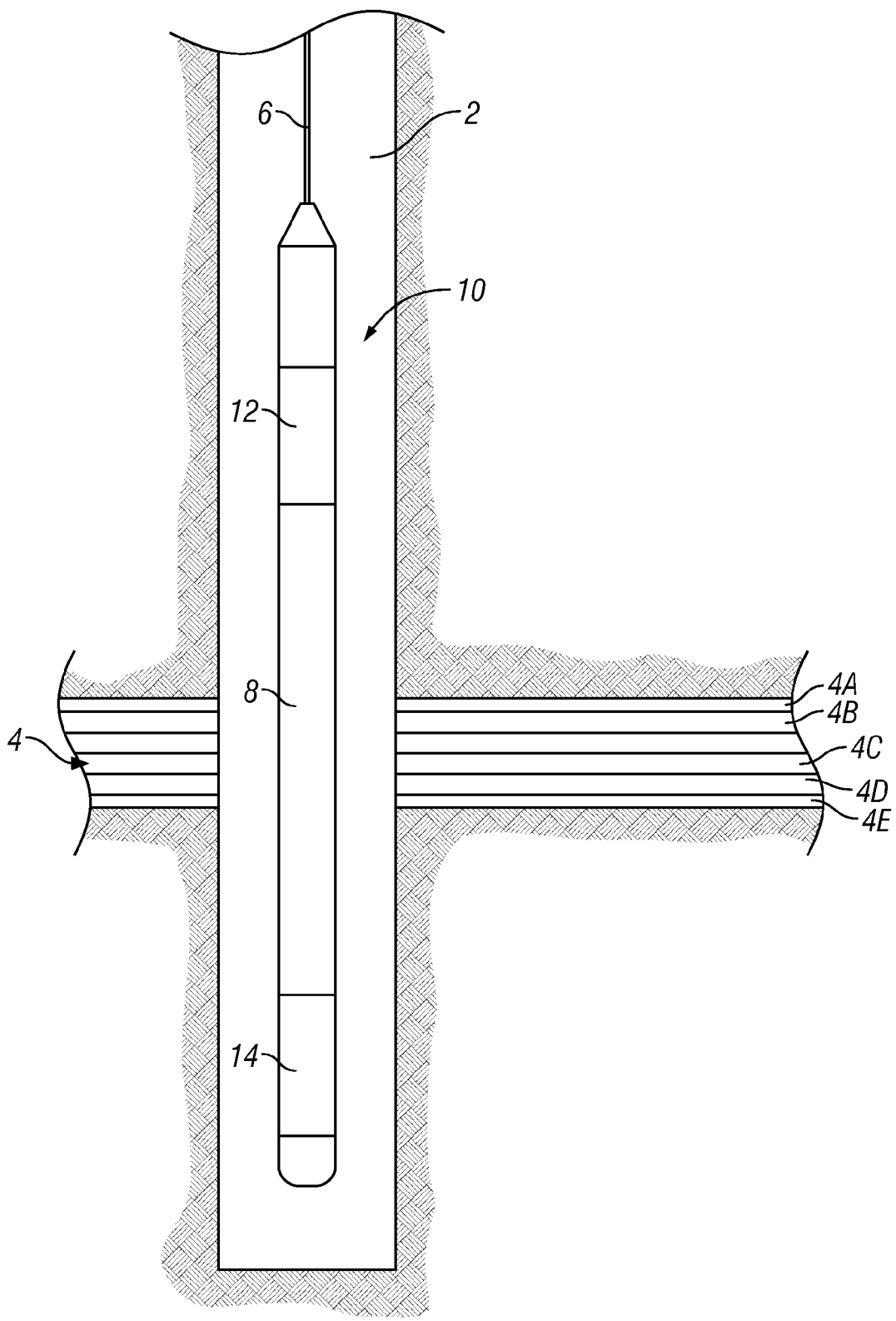
FIG. 1 (Prior Art) illustrates an induction instrument disposed in a borehole penetrating an earth formation.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by use of an armored electrical cable 6 or similar conveyance known in the art. The instrument 10 can be assembled from three subsections: an auxiliary electronics unit 14 disposed at one end of the instrument 10; a antenna mandrel unit 8 attached to the auxiliary electronics unit 14; and a receiver/signal processing/telemetry electronics unit 12 attached to the other end of the antenna mandrel unit 8, this unit 12 typically being attached to the cable 6.

The antenna mandrel unit 8 includes induction transmitter and receiver antennas, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter antennas in the antenna mandrel unit 8. A processor which controls the operation of the tool and processing acquired data may be part of the electronics unit. Alternatively, some or all of the processing and control may be done by a surface processor.

The receiver/signal processing/telemetry electronics unit 12 can include receiver circuits (not shown) for detecting voltages induced in receiver antennas in the antenna mandrel unit 8, and circuits for processing these received voltages (not shown) into signals representative of the conductivities of various layers, shown as 4A through 4E of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
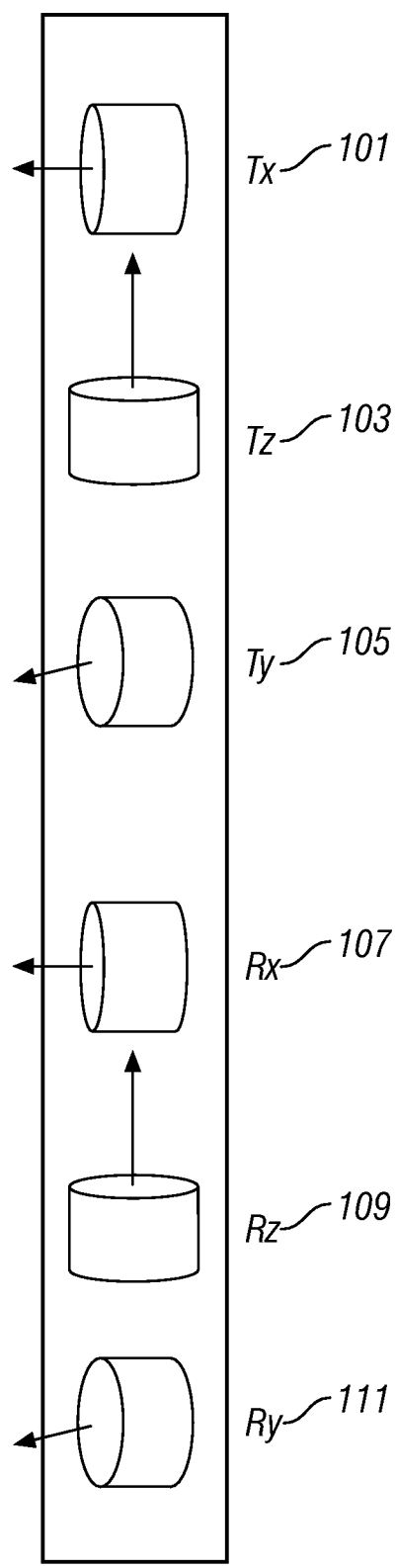
FIG. 2 (Prior Art) illustrates the arrangement of transmitter and receiver antennas in a multi-component induction logging tool marketed under the name 3DExplorer™.

Referring to FIG. 2, the configuration of transmitter and receiver antennas in the 3DEX® multi-component induction logging instrument of Baker Hughes is shown. This is for exemplary purposes only, and any multi-component tool may be used. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. Magnetic fields induced by a transmitter are subsequently recorded at a selected receiver. The magnetic field is generally referred to with indices indicating the orientation of the transmitter used and the orientation of the receiver used. Thus $H_{xy}$, for example, indicates the response of a field generated by the $T_x$ transmitter and subsequently recorded at the $R_y$ receiver. In one mode of operation of the tool, the $H_{xx}$, $H_{yy}$, $H_{zz}$, $H_{xy}$, and $H_{xz}$ components are measured, though other components may also be used. It should be noted that the method of the present disclosure may also be used with non-orthogonal configurations of transmitters and receivers. Well known coordinate rotation methods may be used with such non-orthogonal measurements to rotate them into the desired orientation. For the purposes of the present disclosure, all such measurements (orthogonal and non-orthogonal) will be referred to as multi-component measurements.

Figure 3A:
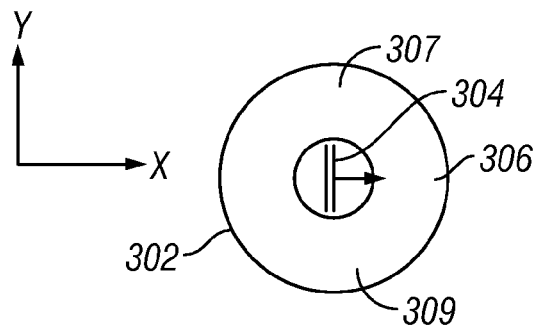
FIGS. 3A-C show a cross-sectional view of an induction tool at different locations within a borehole.
Figure 3B:
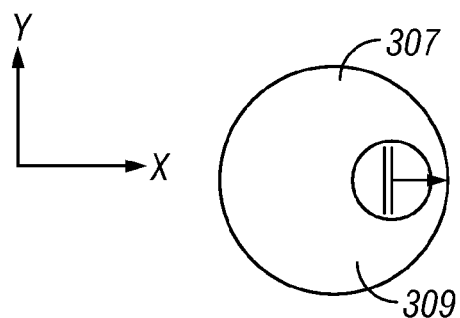
Figure 3C:
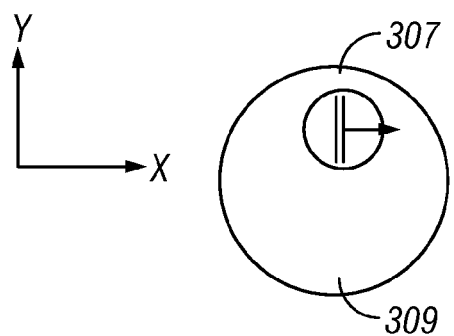

FIGS. 3A-C show cross-sectional views of an induction tool at different positions within a borehole. Induction tools generally give rise to a current flow in the conductive drilling mud that surrounds the tool and fills the borehole. Tool eccentricity generally causes more problems to transverse (X or Y) antennas than to axial (Z) antennas. FIG. 3A shows an x-oriented tool 304 that is centered within the borehole 302 filled with mud 306. In one aspect, the current induced in the borehole generally flows along the axial channel 307 and in the opposite direction along the axial channel 309. Due to the symmetry of the current flow channels (307 and 309) and the entirety of the current flowing in the mud, the centered induction tool does not experience an eccentricity effect. In FIG. 3B, the tool is decentralized along the x-direction. Due to the orientation of the transmitter, the current flowing along channels 307 and 309 still displays symmetry and thus this eccentricity generally does not affect measurements. FIG. 3C shows the induction tool decentralized along the y-axis, such that channel 307 is constricted while the lower channel is broadened 309. Additionally, current flowing in channel 307 may interact with the formation. Thus, the borehole current flow is highly affected due to decentralization along the y-axis. The net borehole current induces signals in transverse receiver antennas, especially coplanar transmission and receiver antennas. The net current may also induce signals in axial receiver antennas that are at different axial positions from the transverse transmitter antenna. Because the induction current density increases with increasing mud conductivity, the net current-induced signals are stronger for higher mud conductivity.

Figure 4:
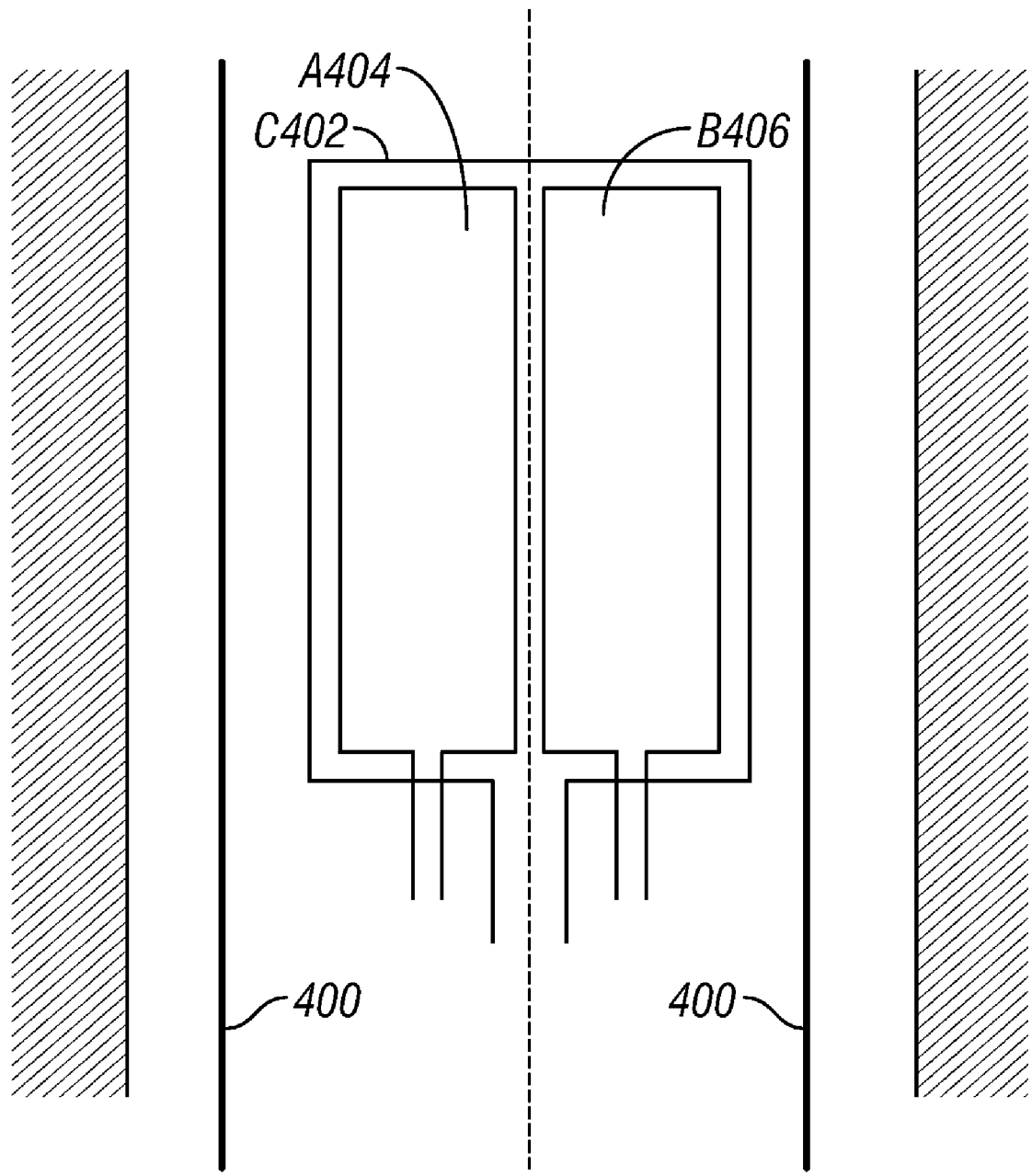
FIG. 4 shows an exemplary antenna set for reducing the effect of borehole current on electrical measurements obtained downhole.

FIG. 4 shows an exemplary antenna set for reducing the effect of borehole current on electrical measurements obtained downhole. The logging tool 400 includes a large loop, such as loop C (402) defining a plane and having an axis of symmetry aligned substantially parallel to the tool axis. The antenna set further includes two small loops, loop A (404) and loop B (406) that lie within the plane of the large loop and are contained by the loop C and symmetrically opposed to each other around the axis of symmetry of the large loop. Loop A and Loop B partition loop C such that the sum of the area of loop A and the area of loop B is substantially equal to the area of loop C. Currents induced in the surrounding formation and borehole fluid create a magnetic field that is detected within each of the loops. The magnetic field from the formation creates currents within each loop which are detected using attached electronics (not shown). The currents induced in each loop are proportional to the magnitude of the magnetic field through each loop. The sum of the signals obtained at loop A 404 and loop B 406 is a function of the formation resistivity plus the borehole effects and is equal to the signal in the loop C 402. The difference between the signals of the two small antennas is a function of the borehole effect on that pair of antennas without contribution from the formation. Thus, the difference of loop A and loop B may be used to determine a borehole effect. In the present instance, the borehole effect may be an eccentering of the tool in a direction perpendicular to the plane of the antenna. Additionally, the loop A and loop B may be used to determine the eccentricity of the loop C and thereby determine the eccentricity of the measurement tool. Due to the geometry of the antenna set $M_A + M_B = M_C$, where M is the magnetic flux through the indicated loop. When the large loop is centered, then $M_A = M_B$. Thus a reading of the corresponding electronic indicators, such as current flow, may indicate that the tool is centered. The difference between the signals $M_A$ and $M_B$ is indicative of the amount of eccentering. A similar split-antenna arrangement may be used for the other components of measurement.

A particular advantage of the apparatus described above is that the measurements are inductive and use the same antennas that are used with the main measurements. U.S. patent application Ser. No. 11/400,548 of the Rabinovich et al., having the same as in the as the present application, and the contents of which are incorporated herein by reference, teaches a method in which off-centered measurements are corrected and used for determination of formation properties. These properties include the horizontal resistivity $R_h$ and the vertical resistivity $R_v$ of the formation.

As discussed in Rabinovich, $H_{xx}$, $H_{yy}$, and $H_{xy}$ components that are oriented at unknown angle $\phi$ with respect to the eccentricity direction and corresponding coordinate system (x', y'). By using a rotation technique, it is possible to extract the unaffected corresponding component $H_{x'x'}$. This unaffected component can then be used in subsequent processing for resistivity anisotropy.

For the eccentered tool the measured $H_{xx}$, $H_{yy}$, and $H_{xy}$ components can be expressed through the principal components $H_{x'x'}$ and $H_{y'y'}$ using the known rotation equation:

$$\begin{pmatrix} H_{xx} \\ H_{yy} \\ H_{xy} \end{pmatrix} = \begin{pmatrix} \cos^2\phi & \sin^2\phi \\ \sin^2\phi & \cos^2\phi \\ -\cos\phi\sin\phi & \cos\phi\sin\phi \end{pmatrix}. \quad (1)$$

This relationship allows us immediately determine the angle $\phi$:

$$\phi = \frac{1}{2}\tan^{-1}\left(\frac{2H_{xy}}{H_{yy} - H_{xx}}\right). \quad (2)$$

Consequently, we can calculate the principal $H_{x'x'}$ component itself:

$$H_{x'x'} = \frac{H_{xx}\cos^2\phi - H_{yy}\sin^2\phi}{\cos^2\phi - \sin^2\phi}. \quad (3)$$

As noted above, multi-component signals can be used for interpreting formation resistivities and petrophysical parameters. The principles used for this interpretation have been discussed, for example, in U.S. Pat. No. 6,470,274 to Mollison et al., U.S. Pat. No. 6,643,589 to Zhang et al., and U.S. Pat. No. 6,636,045 to Tabarovsky et al., the contents of which are incorporated herein by reference. Specifically, the parameters estimated may include horizontal and vertical resistivities (or conductivities), relative dip angles, strike angles, sand and shale content and water saturation. In addition, U.S. patent application Ser. No. 11/125,530 of Rabinovich et al. teaches the use of multi-component measurements for analysis of fractured earth formations that may also have anisotropic layers. These multi-component signals are typically obtained using a multi-component measurement tool having antennas oriented transverse to the tool axis in addition to antennas oriented parallel to the tool axis.

Some or all of the processing may be done by a downhole processor, a processor at the surface, or a processor at a remote location. Implicit in the control and processing of the data is the use of a computer program on a suitable machine-readable medium that enables the processor to perform the control and processing. The machine-readable medium may include read-only memory (ROM), an electrically programmable read-only memory (EPROM), an electrically erasable and programmable read-only memory (EEPROM), flash memory, optical disks, hard drives, and non-volatile read-write memory (NOVRAM).

The disclosure may also be implemented in conjunction with a measurement-while-drilling arrangement in which the multi-component and multi-array measurements are made using a suitable device on a bottomhole assembly conveyed on a drilling tubular such as a drillstring.

While the foregoing disclosure is directed to the preferred embodiments of the disclosure, various modifications will be apparent to those skilled in the art. It is intended that all variations within the scope of the appended claims be embraced by the foregoing disclosure.

What is claimed is:

1. An apparatus configured to evaluate an earth formation, the apparatus comprising:
    a logging tool configured to be conveyed in a borehole;
    two coplanar receiver antennas on the logging tool with a center of each antenna disposed at a known distance from an axis of the logging tool; and
    a processor configured to determine a presence of a borehole effect from a difference of outputs of the two antennas responsive to an activation of a transmitter on the logging tool.

2. The apparatus of claim 1 further comprising an additional receiver antenna encompassing the two coplanar receiver antennas.

3. The apparatus of claim 2 wherein the processor is further configured to:
    (i) process the output from at least one of (I) the additional receiver antenna, and (II) the two coplanar receiver antennas, to correct for the borehole effect; and
    (ii) estimate from the corrected output a resistivity property of the earth formation.

4. The apparatus of claim 1 wherein the borehole effect further comprises an eccentering of the logging tool in the borehole.

5. The apparatus of claim 1 wherein the processor is further configured to estimate at least one of: (i) a horizontal resistivity property, (ii) a vertical resistivity property, (iii) a relative dip angle, (iv) a relative strike angle, (v) a sand content of the formation, (vi) a shale content of the formation, and (vii) a water saturation of the formation.

6. A method of evaluating an earth formation, the method comprising:
    conveying a logging tool into a borehole;
    activating a transmitter antenna on the logging tool and making measurements using two coplanar receiver antennas each having a center at a known distance from an axis of the logging tool responsive to the activation of the transmitter antenna; and
    determining a presence of a borehole effect from a difference of outputs of the two coplanar receiver antennas.

7. The method of claim 6 further comprising making a measurement with an additional receiver antenna encompassing the two coplanar receiver antennas.

8. The method of claim 7 further comprising:
    (i) processing the output from at least one of (I) the additional antenna, and (II) the two coplanar antennas, to correct for the effects of the borehole effect; and
    (ii) estimating from the corrected output a resistivity property of the earth formation.

9. The method of claim 6 wherein determining the presence of the borehole effect further comprises estimating an eccentering of the logging tool in the borehole.

10. The method of claim 6 further comprising estimating at least one of: (i) a horizontal resistivity property, (ii) a vertical resistivity property, (iii) a relative dip angle, (iv) a relative strike angle, (v) a sand content of the formation, (vi) a shale content of the formation, and (vii) a water saturation of the formation.

11. A computer readable medium product having stored thereon instructions that when read by a processor, cause the processor to perform a method comprising:
    determining a presence of a borehole effect from a difference of outputs of two coplanar receiver antennas each having a center at a known distance from an axis of a logging tool conveyed in a borehole penetrating an earth formation the outputs being responsive to an activation of a transmitter antenna on the logging tool;
    processing the output from the two coplanar receiver antennas to correct for the borehole effect; and
    estimating from the corrected output a resistivity property of the earth formation.

12. The medium of claim 11 further comprising at least one of: (i) a read-only memory, (ii) an electrically programmable read-only memory, (iii) an electrically erasable and programmable read-only memory, (iv) a flash memory, (v) and optical disk, (vi) a hard drive, and (vii) a non-volatile read-write memory.

* * * * *